Aug. 2, 1949.  A. L. PARKER  2,478,127
EMERGENCY REPAIR COUPLING
Filed Dec. 14, 1944
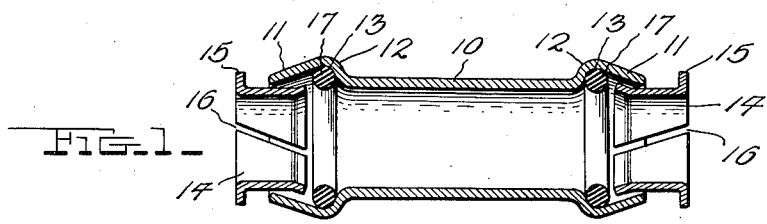
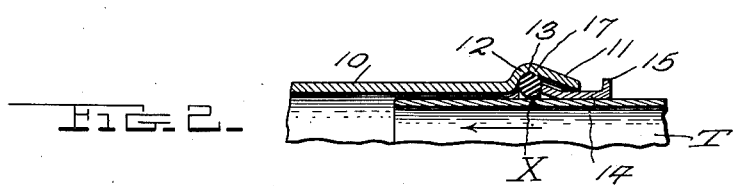
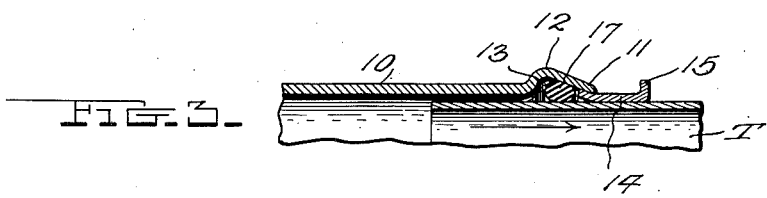
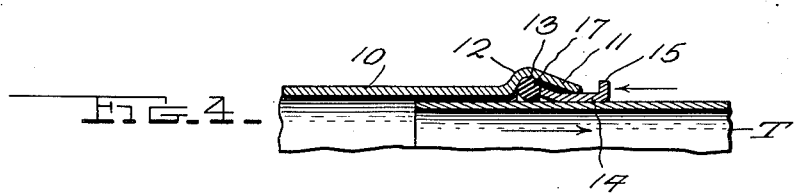
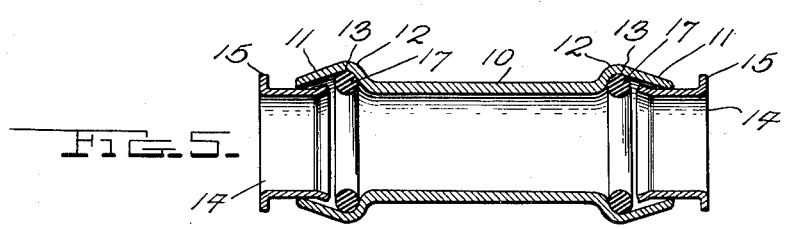
Inventor
Arthur L. Parker
By Mason, Porter & Diller
Attorneys Patented Aug. 2, 1949

2,478,127

UNITED STATES PATENT OFFICE 2,478,127

EMERGENCY REPAIR COUPLING

Arthur L. Parker, Cleveland, Ohio, assignor to The Parker Appliance Company, Cleveland, Ohio, a corporation of Ohio Application December 14, 1944, Serial No. 568,131

1 Claim. (Cl. 285—116)

This invention is a device primarily designed for emergency repair of broken tubes, but not limited to such use.

One of the objects of the invention is to provide a device of simple and inexpensive construction, which will be capable of securely uniting and effectively sealing the separated ends of a broken tube, so that the latter will be fully capable of continuing the functions for which it was originally designed.

A further object of the invention is to provide a device which may be easily applied to the broken ends of the tube, and secured thereto, with a minimum loss of time.

Another object of the invention is to provide means whereby the coupling may be readily and quickly disconnected from the ends of the broken tube whenever disengagement of the parts becomes necessary.

The invention will be hereinafter fully set forth and particularly pointed out in the claims.

In the accompanying drawings:

Figure 1 is a longitudinal sectional view of an emergency tube-repair coupling conforming to the invention, the parts being illustrated in their normal positions before being telescoped over adjacent ends of a broken tube.

Figure 2 is a fragmentary longitudinal sectional view illustrating the parts of the coupling in the positions occupied while the latter is being slid along a portion of the broken tube, or the tube is being moved into the coupling.

Figure 3 is a fragmentary longitudinal sectional view illustrating the joint as it would appear under pressure, or under endwise pull on the tube, or both.

Figure 4 is a fragmentary longitudinal sectional view illustrating the method of disconnecting the coupling from the tube.

Figure 5 is a longitudinal sectional view similar to Figure 1 illustrating a slight modification.

Referring to the drawings, 10 designates a coupling body of tubular form having inwardly sloping end flanges 11. The wall of the body 10 is expanded outwardly at 12 to provide an internal annular recess 13, the sloping flanges 11 serving as parts of the walls of said recesses. Each flange is so positioned as to impart a tapering cross section to its recess, with the narrow part of the taper located near the adjacent end of said body 10.

Telescoping into each end of the body 10 is a sleeve 14, which is provided with an outer annular flange 15, the inner end of the sleeve being flared so that it will engage the adjacent flange 11, and thereby prevent separation of the sleeve 14 from the body 10. It is preferred to provide each sleeve 14 with a slit 16, and to make the sleeve of slightly less diameter than the external diameter of the tube T to be repaired, so that when the coupling is slipped over the said tube, the sleeve will be expanded slightly so as to frictionally grip said tube.

Located within the chamber 13 is an annular anchoring ring 17 of deformable material, the internal diameter of said ring being slightly less than the external diameter of the tube T.

In practice, when it is desired to repair a broken tube, one end of the coupling body 10 is slid along the tube T, as indicated in Figure 2, or the tube may be moved into the coupling. The slight radial squeeze on the anchoring ring 17 permits easy entrance of the tube and forms a seal as clearly indicated at X in Figure 2. Should the sealed joint thus provided be subjected to endwise pull on the tube T, tending to withdraw the latter from the coupling, the sleeve 14 and the adjacent ring 17 will move with the tube. This movement will effect a rolling of the ring 17 into the narrow portion of its tapered recess 13. Pressure will also help force said ring into the reduced portion of the recess, thereby effecting a firm grip on the tube and a tight seal. See Figure 3. Furthermore, it will be noted that the sleeve 14 is a split sleeve. The inner end of this sleeve is tapered outwardly and so dimensioned that when it is pulled outward to the position shown in Figure 3, the sleeve will contact with the end of the body member and be contracted into tight gripping relation with the tube T. This will serve as a further means for preventing the tube from being pulled out of the coupling member. The ring as noted effects a firm grip on the tube and this produces a tight seal, and it will also aid in the holding of the tube in the body member.

When it is desired to disconnect the coupling from the tube, the sleeve 14 is forced inwardly, for instance toward the left as viewed in Figure 4, so as to force the ring 17 back into its original position within the larger portion of the tapered recess 13, as shown in Figure 4. This prevents wedging of the ring 17 during relative movement of the coupling and tube, thereby rendering it more easy to shift the coupling relative to the tube. Of course, if it should be desired to shift the coupling toward the left to telescope the adjacent end of the broken tube, the sleeve 14 would be held in the position of Figure 2 to prevent the wedge-locking of the ring 17 and the sleeve.

The emergency repair coupling illustrated in Figure 5 differs from the structure illustrated in Figure 1, in that the sleeves 14 are not provided with slits. Except for this feature there are no substantial differences.

The advantages of the invention will be readily understood by those skilled in the art to which it belongs. In this connection, it will be understood that although the device has been particularly referred to as adapted for the emergency repair of broken tubes, it is obviously capable of other uses. Therefore, there is no intent to limit the invention in this respect. An important advantage of the invention is that it makes possible the bringing together and securely sealing the broken ends of a tube, in such manner that the repaired tube will be fully capable of continuing the functions for which it may have been designed.

A further advantage is that the device may be readily and quickly applied to the broken ends of a tube, and may just as quickly and readily be disconnected therefrom if occasion for disconnection should arise.

While the invention has been described as particularly adapted for an emergency tube-repair coupling, it will be understood that from certain aspects the coupling may be used any place where it is desired to attach a tube to another part, in which case the part to which the tube is attached should be the body member.

What I claim is:

An emergency tube-repair coupling comprising an open-ended tubular body for receiving the adjacent ends of a broken tube, said body having inwardly extended sloping annular end portions and also having internal recesses adjacent said respective end portions, said sloping portions forming parts of the walls of said recesses, so that the latter will be of tapered cross section, a deformable sealing ring movably located within each recess so that disengaging movement of the adjacent portion of the broken tube will cause the adjacent ring to roll toward and to be wedged within the reduced portion of its recess, and split sleeves telescoping within the ends of said body and having their inner ends enlarged so as to engage said sloping edge portions and thereby prevent separation of the body and the sleeve, each sleeve being normally of slightly less diameter than the outside diameter of the tube to be repaired, so that it will be expanded slightly to frictionally engage the tube, each sleeve being so positioned that its inner end will engage an adjacent anchoring ring, so that if the sleeve is forced inwardly into the end of the body while it is engaged with the tube, it will move the ring out of the reduced portion of its recess into the larger portion of the latter.

ARTHUR L. PARKER.

REFERENCES CITED

The following references are of record in the file of this patent:

UNITED STATES PATENTS

| Number | Name | Date |
|---|---|---|
| 1,508,026 | Noble | Sept. 9, 1924 |
| 2,069,377 | Matthiessen | Feb. 2, 1937 |
| 2,111,956 | Baldwin | Mar. 22, 1938 |
| 2,127,086 | McGrath | Aug. 16, 1938 |
| 2,182,797 | Dillon | Dec. 12, 1939 |
| 2,346,051 | Seamark | Apr. 4, 1944 |